United States Patent
Akamine et al.

(10) Patent No.: US 8,679,411 B2
(45) Date of Patent: Mar. 25, 2014

(54) EXHAUST-GAS PURIFICATION CATALYTIC SYSTEM

(75) Inventors: Masaaki Akamine, Hiroshima (JP); Masahiko Shigetsu, Higashi-Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 233 days.

(21) Appl. No.: 13/353,266

(22) Filed: Jan. 18, 2012

(65) Prior Publication Data

US 2012/0189503 A1 Jul. 26, 2012

(30) Foreign Application Priority Data

Jan. 26, 2011 (JP) ................... 2011-014331

(51) Int. Cl.
 *B01D 50/00* (2006.01)
 *B01J 2/10* (2006.01)

(52) U.S. Cl.
 USPC ........................... 422/171; 502/302; 502/304

(58) Field of Classification Search
 USPC ................... 422/171, 177; 502/302, 304, 326
 See application file for complete search history.

(56) References Cited

U.S. PATENT DOCUMENTS

| | | | |
|---|---|---|---|
| 6,087,298 A * | 7/2000 | Sung et al. | 502/333 |
| 7,344,683 B2 | 3/2008 | Miyoshi et al. | |
| 7,785,545 B2 * | 8/2010 | Miyoshi et al. | 422/180 |
| 2011/0045968 A1 | 2/2011 | Akamine et al. | |

FOREIGN PATENT DOCUMENTS

| | | |
|---|---|---|
| JP | 2006-035043 A | 2/2006 |
| JP | 2006-062156 A | 3/2006 |
| JP | 2006-291918 A | 10/2006 |
| JP | 2010-071765 A | 4/2010 |
| JP | 2011-062683 A | 3/2011 |

* cited by examiner

*Primary Examiner* — Tom Duong
(74) *Attorney, Agent, or Firm* — Studebaker & Brackett PC

(57) ABSTRACT

A Rh-including catalyst layer of an upstream catalyst 3 includes Rh-doped CeZr-based mixed oxide and Rh-loading CeZr-based mixed oxide as oxygen storage/release materials. A Rh-including catalyst layer of a downstream catalyst 5 includes only Rh-doped CeZr-based mixed oxide as an oxygen storage/release material. The content of the oxygen storage/release materials included in the Rh-including catalyst layer of the upstream catalyst 3 is smaller than that of the downstream catalyst 5. The Rh-doped CeZr-based mixed oxide of the upstream catalyst 3 shows a particle size distribution having a peak particle size smaller than that of the Rh-doped CeZr-based mixed oxide of the downstream catalyst 5.

7 Claims, 7 Drawing Sheets

EXHAUST-GAS PURIFICATION CATALYTIC SYSTEM

CROSS-REFERENCE TO RELATED APPLICATION

This application claims priority to Japanese Patent Application No. 2011-014331 filed on Jan. 26, 2011, the disclosure of which including the specification, the drawings, and the claims is hereby incorporated by reference in its entirety.

BACKGROUND

The present disclosure relates to exhaust-gas purification catalytic systems.

Hybrid automobiles employing both engines and electric motors as drive sources can reduce emission which is an environmental load. In addition, it is also important to further efficiently purify exhaust gas from engines. Automobiles whose engines operate near the stoichiometric air-fuel ratio conventionally employ three-way catalysts capable of purifying hydrocarbon (HC), CO, and nitrogen oxide (NOx) at the same time. As catalytic metals, Pt, Pd, and Rh, for example, have been employed.

In such a three-way catalyst, purification performance for HC, CO, and NOx described above degrades when the air-fuel ratio of an exhaust gas from an engine comes to be in a lean or rich condition. To prevent this degradation, the three-way catalyst includes an oxygen storage/release material which stores oxygen when the ambience of the catalyst is in a lean condition, and releases oxygen when the ambience of the catalyst is in a rich condition. That is, the storage and release of oxygen can control the air-fuel ratio of the ambience of the catalyst toward stoichiometry, thereby preventing degradation of performance in purifying an exhaust gas. In addition, since this Ce-containing oxide alone is limited in storage/release amount of oxygen, a component promoting oxygen storage is loaded on the surface of the Ce-containing oxide. This component is, for example, Pt, Pd, or Rh.

Specifically, Pt, Pd, and Rh function not only as catalytic metals promoting oxidation of HC and CO and reduction of NOx, but also as components controlling the air-fuel ratio of the ambience of the three-way catalyst together with an oxygen storage/release material so as to allow the three-way catalyst to easily exhibit purification performance. However, since Pt, Pd, and Rh are scarce resources, it is required for a catalyst to exhibit a high exhaust-gas purification performance with reduced amount of Pt, Pd, and Rh.

In a known exhaust-gas purification catalytic system, three-way catalysts are disposed at an upstream side and a downstream side in an exhaust-gas flow in an exhaust passage of an engine. For example, in such a system, a so-called close-coupled catalyst coupled to a downstream end of an exhaust manifold and a so-called underfloor catalyst placed under the automobile floor at a downstream side in an exhaust-gas flow are used to purify an exhaust gas. In this catalytic system, the upstream close-coupled catalyst rapidly comes to have a temperature at which this close-coupled catalyst is active by heat of the exhaust gas, and therefore, is effective for purification of an exhaust gas discharged at, for example, a start-up of the engine and having a relatively low temperature. On the other hand, the downstream underfloor catalyst also has a temperature at which this underfloor catalyst is active around a time when a relatively large amount of a high-temperature exhaust gas is discharged from the engine. Accordingly, cooperation of the close-coupled catalyst and the underfloor catalyst can efficiently purify an exhaust gas.

A catalytic system constituted by upstream and downstream catalysts as described above is described in, for example, Japanese Patent Publication No. 2006-291918. Specifically, in this publication, a Rh-doped CeZr-based double oxide is employed as an oxygen storage/release material for an upstream catalyst, thereby achieving a structure in which the oxygen storage material for the upstream catalyst stores a larger amount of oxygen than that for the downstream catalyst under the same temperature. This structure is intended to reduce the size, or improve the layout, of the system while enhancing exhaust-gas purification performance and ensuring thermal resistance. This publication describes that enhancement of performance of the oxygen storage/release material for the upstream catalyst allows excellent exhaust-gas purification performance to be obtained even in a case where the air-fuel ratio of an exhaust gas varies in a wide range.

Japanese Patent Publication No. 2008-62156 describes that a material in which Rh is loaded on the surface of Rh-doped CeZrNd double (composite oxide) oxide is employed as an oxygen storage/release material for a downstream catalyst, and an oxygen storage/release material capable of storing a smaller amount of oxygen than Rh-doped CeZrNd double oxide is employed for an upstream catalyst. This structure is intended to solve a problem in which Rh loaded on the surface of the Rh-doped CeZrNd double oxide is oxidized by active oxygen released from this double oxide with a variation of the air-fuel ratio to fail to return to a reduction state in which the catalyst activity is high. Specifically, Rh-loading Rh-doped CeZrNd double oxide is employed not for the upstream catalyst but for the downstream catalyst, and HC and CO which have slipped through the upstream catalyst to flow toward a downstream side are used as reducing agents and Rh loaded on the surface of the Rh-doped CeZrNd double oxide is maintained in a highly active state. In addition, activated alumina loading Pt is provided in the downstream catalyst such that HC described above is oxidized to be converted into, for example, CO having high reducing power, thereby activating (reducing) Rh.

Japanese Patent Publication No. 2006-35043 shows that a combination of Rh-doped CeZrNd double oxide and Pt-loading alumina allows the Pt-loading alumina to reduce oxidation of Rh in the Rh-doped CeZrNd double oxide occurring when an exhaust gas is continuously in a lean condition.

The structure of the catalytic system in the above publication significantly enhances light-off characteristics (i.e., reducing the light-off temperature) for purification of HC, CO, and NOx and purification performance at high temperatures, thereby obtaining a high purification efficiency even in a case where the air-fuel ratio of an exhaust gas varies. However, in operation of automobiles, the air-fuel ratio of an exhaust gas might rapidly become a lean condition due to a fuel cut at deceleration in some cases. In such cases, purification of NOx degrades.

SUMMARY

It is therefore an object of the present disclosure to provide an exhaust-gas purification catalytic system including an upstream catalyst and a downstream catalyst and capable of efficiently purifying HC, CO, and NOx, irrespective of the level of the temperature of an exhaust gas even in a situation where the air-fuel ratio rapidly becomes a lean condition.

To achieve the above object, the present disclosure employs a configuration in which oxygen is stored or released at relatively low temperatures in a catalyst layer of the upstream catalyst, and heat of catalytic reaction generated with purification of an exhaust gas in the catalyst layer of the upstream catalyst is utilized for a temperature rise in the downstream catalyst.

Specifically, an exhaust-gas purification catalytic system according to the present disclosure includes an upstream catalyst and a downstream catalyst provided upstream and downstream, respectively, in a flow of exhaust gas in an exhaust passage of an engine, wherein each of the upstream catalyst and the downstream catalyst includes an Rh-including catalyst layer including Rh and provided on a substrate, the Rh-including catalyst layer of the upstream catalyst includes, as oxygen storage/release materials, Rh-doped CeZr-based mixed oxide containing Ce and Zr and also containing Rh dissolved therein, and Rh-loading CeZr-based mixed oxide containing Ce and Zr and loading Rh on a surface thereof, the Rh-including catalyst layer of the downstream catalyst includes, as an oxygen storage/release material, only Rh-doped CeZr-based mixed oxide containing Ce and Zr and also containing Rh dissolved therein, a content of the oxygen storage/release material included per 1 L of the substrate in the Rh-including catalyst layer of the upstream catalyst is smaller than that of the downstream catalyst, and the Rh-doped CeZr-based mixed oxide included as the oxygen storage/release material in the Rh-including catalyst layer of the upstream catalyst shows a particle size distribution having a peak particle size smaller than that of the Rh-doped CeZr-based mixed oxide included as the oxygen storage/release material in the Rh-including catalyst layer of the downstream catalyst.

The Rh-including catalyst layer of each of the upstream catalyst and the downstream catalyst includes Rh-doped CeZr-based mixed oxide as an oxygen storage/release material. In particle size distribution of this Rh-doped CeZr-based mixed oxide, the structure in which a peak particle size of the upstream catalyst is smaller than that of the downstream catalyst causes the Rh-doped CeZr-based mixed oxide of the upstream catalyst to be more often in contact with an exhaust gas than the Rh-doped CeZr-based mixed oxide of the downstream catalyst. Accordingly, in the Rh-including catalyst layer of the upstream catalyst, even at a low exhaust-gas temperature, oxygen is relatively actively stored or released by the Rh-doped CeZr-based mixed oxide.

Thus, although the content of the oxygen storage/release material in the Rh-including catalyst layer of the upstream catalyst is smaller than that in the downstream catalyst, reduction of NOx and oxidation of HC and CO are efficiently performed in a situation where the air-fuel ratio of an exhaust gas rapidly becomes a lean condition (where the temperature of the exhaust gas is also low) such as at deceleration of an automobile. Accordingly, heat of catalytic reaction generated with the above process causes the temperature of the Rh-including catalyst layer of the downstream catalyst to increase, resulting in that the exhaust gas can be easily purified even in the downstream catalyst. In addition, since the content of the oxygen storage/release material is small in the Rh-including catalyst layer of the upstream catalyst, the thermal capacity of the catalyst can be reduced. As a result, advantageously, the temperature of the catalyst can be increased at an early stage, thereby enhancing the exhaust gas purification performance and reducing the cost.

Preferably, the Rh-doped CeZr-based mixed oxide of the downstream catalyst shows a particle size distribution whose peak is in the particle size range from 550 nm to 1200 nm, both inclusive, and the Rh-doped CeZr-based mixed oxide of the upstream catalyst shows a particle size distribution whose peak is in a particle size range (e.g., from 100 nm to 300 nm, both inclusive) smaller than the oxygen storage/release material for the upstream catalyst.

In a preferred embodiment, the downstream catalyst includes only the Rh-including catalyst layer on the substrate, and the Rh-including catalyst layer further includes Pt-loading alumina in which Pt is loaded on a surface of activated alumina, in addition to the Rh-doped CeZr-based mixed oxide as the oxygen storage/release material.

Specifically, although Pt mainly acts on oxidation of HC and CO, and Rh mainly acts on reduction of NOx, Rh is oxidized to have its catalytic function deteriorate when exposed to an exhaust gas with a lean air-fuel ratio. On the other hand, when the air-fuel ratio becomes a rich condition, the amount of HC and CO serving as reducing agents around Rh increases accordingly. However, when the ambient temperature of Rh is low, Rh cannot be reduced.

In contrast, Pt can oxidize and purify HC and CO even when the air-fuel ratio switches from a lean condition to a rich condition. The heat of this catalytic reaction increases the ambient temperature of Rh, and highly active HC which is partially oxidized by this catalytic reaction is generated. Accordingly, Rh in the oxidized state is easily reduced by HC and CO in the exhaust gas, and further, partially oxidized HC, and the activity thereof can be maintained. As a result, NOx can be advantageously reduced.

In addition, the downstream catalyst includes only the Rh-including catalyst layer on the substrate, and thus, the thermal capacity thereof can be reduced. Accordingly, the temperature of the downstream catalyst due to heat of catalytic reaction generated in the upstream catalyst can be advantageously increased at an early stage. Thus, an exhaust gas can be effectively purified by cooperation of Rh-doped CeZr-based mixed oxide and Pt-loading alumina.

In a preferred embodiment, the Rh-including catalyst layer of the upstream catalyst further includes a catalytic component in which ZrLa-based mixed oxide containing Zr, La, and an alkali earth metal is loaded on activated alumina and in which Rh is loaded on the ZrLa-based mixed oxide, in addition to the Rh-doped CeZr-based mixed oxide and the Rh-loading CeZr-based mixed oxide as the oxygen storage/release materials.

Specifically, since activated alumina has a high thermal resistance and a large specific surface area, the activated alumina can carry Rh in a high dispersion state, and can advantageously enhance the catalyst activity. However, if the catalyst layer is often exposed to high temperatures, Rh is dissolved in alumina to be gradually deactivated with time. In contrast, in the case of the above catalyst particles in which ZrLa-based mixed oxide is loaded on the activated alumina and Rh is loaded on the ZrLa-based mixed oxide, Rh can be loaded on the activated alumina in a high dispersion state with the ZrLa-based mixed oxide interposed therebetween, and in addition, dissolution of Rh in the activated alumina is prevented by the ZrLa-based mixed oxide. Thus, this structure can advantageously reduce the deactivation described above.

In addition, Rh on the ZrLa-based mixed oxide is not significantly reduced and is appropriately oxidized even when the air-fuel ratio of an exhaust gas changes from a lean condition to a rich condition. Specifically, it is expected that Rh loaded on ZrLa-based mixed oxide causes bonding of La—O—Rh between this ZrLa double oxide and Rh, and Rh is easily in an oxidized state due to the function of La. Consequently, although reduction of Rh is disadvantageous for oxidation of HC and CO, Rh on the ZrLa double oxide is kept in an appropriately oxidized state even when the air-fuel ratio becomes a rich condition, and thus, HC oxidation power and CO oxidation power do not significantly degrade. In addition, since HC and CO are oxidized even in a rich condition, NOx reduction proceeds with these oxidations, and thus, NOx can be advantageously reduced and purified.

The ZrLa-based mixed oxide further contains an alkali earth metal in addition to Zr and La. Thus, adsorption and purification of exhaust gas components are efficiently performed. As a result, an exhaust gas can be advantageously purified. Specifically, oxides of Zr and La are basic, and an alkali earth metal is more strongly basic than these oxides. Accordingly, various basic sites having different intensities are formed in the ZrLa-based mixed oxide, and adsorption and purification of exhaust gas components are efficiently performed.

The alkali earth metal described above is preferably Mg, Ca, or Sr, each of which is easily dissolved in $ZrO_2$. Among these elements, Sr which is strongly basic is especially preferable. Two or more these alkali earth metals may be included.

DETAILED DESCRIPTION

Embodiments of the present disclosure will be described hereinafter with reference to the drawings. Note that the following description of the preferred embodiments is merely illustrative in nature, and is not intended to limit the scope, applications, and use of the present disclosure.

Figure 1:
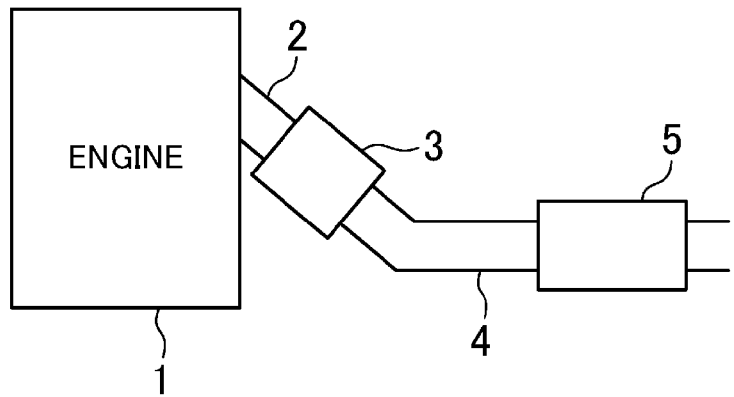
FIG. 1 is a view illustrating an exhaust-gas purification catalytic system according to an embodiment of the present disclosure.

In an inventive exhaust-gas purification catalytic system illustrated in FIG. 1, reference character 1 denotes an engine of an automobile, reference character 2 denotes an exhaust manifold, reference character 3 denotes an upstream catalyst directly coupled to a downstream end of the exhaust manifold 2, reference character 4 denotes an exhaust pipe extending rearward of the automobile from the upstream catalyst 3, and reference character 5 denotes a downstream catalyst provided in the exhaust pipe 4 under the floor of the automobile. That is, the upstream catalyst 3 and the downstream catalyst 5 are separately disposed at upstream and downstream, respectively, in a flow of an exhaust gas in an exhaust passage of the engine 1.

Figure 2:
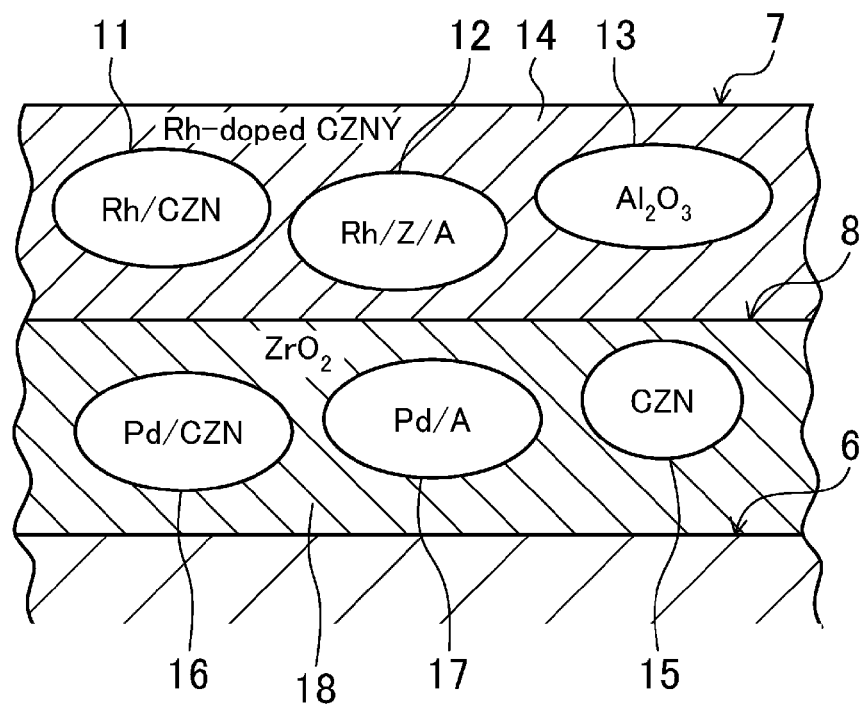
FIG. 2 is a view illustrating a structure of an upstream catalyst of the purification catalytic system.

FIG. 2 is a view schematically illustrating a structure of the upstream catalyst 3. In FIG. 2, reference character 6 denotes a cell wall of a honeycomb substrate. An upper catalyst layer 7 and a lower catalyst layer 8 are stacked on the cell wall 6. The surface of the upper catalyst layer 7 constitutes an exhaust gas passage of the honeycomb substrate 6.

The upper catalyst layer 7 is a Rh-including catalyst layer, includes Rh-loading CeZrNd mixed oxide (Rh/CZN) 11, Rh-loading ZrLa-based mixed oxide covered alumina (Rh/Z/A) 12, and activated alumina ($Al_2O_3$) 13, and further includes Rh-doped CeZrNdY mixed oxide (Rh-doped CZNY) 14 having a particle size smaller than those of other catalyst particles.

In the upper catalyst layer 7, the Rh-loading CeZrNd mixed oxide 11 and the Rh-doped CeZrNdY mixed oxide (small particles) 14 are used as oxygen storage/release materials loading or including Rh. The Rh-doped CeZrNdY mixed oxide (small particles) 14 also serves as a binder material. The Rh-doped CeZrNdY mixed oxide (small particles) 14 has a particle size reduced by further wet grinding Rh-doped CeZrNdY mixed oxide (large particles) prepared by coprecipitation, which will be described later.

The lower catalyst layer 8 is a Pd-including catalyst layer, and includes CeZrNd mixed oxide (CZN) 15, Pd-loading CeZrNd mixed oxide (Pd/CZN) 16, and Pd-loading activated alumina (Pd/A) 17, and further includes a zirconia binder ($ZrO_2$) 18. The CeZrNd mixed oxide 15 and the Pd-loading CeZrNd mixed oxide 16 of the lower catalyst layer 8 also have oxygen storage/release capacities.

Figure 3:
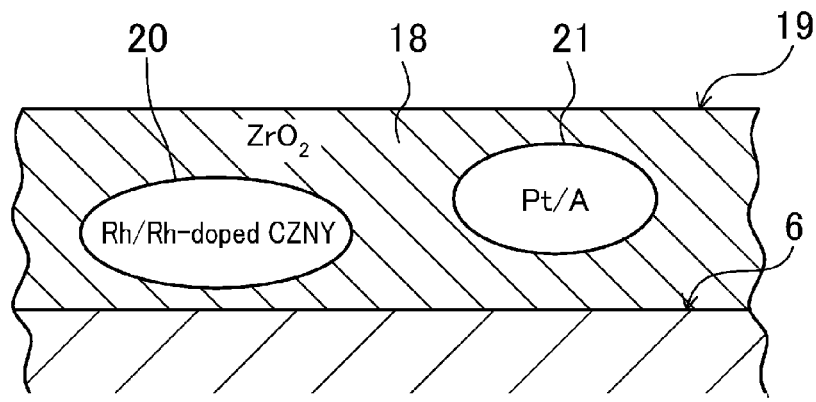
FIG. 3 is a view illustrating a structure of a downstream catalyst of the purification catalytic system.

FIG. 3 is a view schematically illustrating a structure of the downstream catalyst 5. The downstream catalyst 5 includes a single catalyst layer 19 provided on a cell wall 6 of a honeycomb substrate. The surface of the catalyst layer 19 constitutes an exhaust gas passage of the honeycomb substrate 6. The catalyst layer 19 is a catalyst layer containing Rh and Pt, includes Rh-loading Rh-doped CeZrNd mixed oxide (Rh/Rh-doped CZN) 20 in which Rh is loaded on the surface of Rh-doped CeZrNd mixed oxide and Pt-loading alumina (Pt/A) 21 in which Pt is loaded on the surface of activated alumina, and further includes a zirconia binder ($ZrO_2$) 18. In the catalyst layer 19, the Rh-loading Rh-doped CeZrNd mixed oxide 20 is used as an oxygen storage/release material loading or including Rh. The Rh-doped CeZrNd mixed oxide included in the catalyst layer of the downstream catalyst 5 contains Rh, Ce, Zr, and Nd as metal components, and does not contain Y.

In the Rh-loading Rh-doped CeZrNd mixed oxide 20, Rh is loaded on Rh-doped CeZrNd mixed oxide (large particles) showing a particle size distribution having a peak particle size larger than that of the Rh-doped CeZrNdY mixed oxide (small particles) 14 of the upper catalyst layer 7 of the upstream catalyst 3.

A feature of the catalytic system is to employ the Rh-doped CeZrNdY mixed oxide (small particles) 14 as an oxygen storage/release material and a binder material in the upper catalyst layer 7 of the upstream catalyst 3. This Rh-doped CeZrNdY mixed oxide (small particles) is prepared using coprecipitation and wet grinding in the following manner.

Specifically, cerium nitrate hexahydrate, a zirconyl oxynitrate solution, neodymium nitrate hexahydrate, yttrium nitrate hexahydrate, and a rhodium nitrate solution are dissolved in ion-exchanged water. In this nitrate solution, an 8-fold dilution of 28 mass % of aqueous ammonia is mixed and neutralized, thereby obtaining a coprecipitate. This coprecipitate is washed by centrifugation, dried in the air at 150° C. for 24 hours, grinded, and then held in the air at 500° C. for two hours, thereby obtaining powder of Rh-doped CeZrNdY mixed oxide (large particles).

Then, ion-exchanged water is added to the powder of Rh-doped CeZrNdY mixed oxide (large particles), thereby producing slurry (having a solid content of 25 mass %). This slurry is then placed in a ball mill, and is ground (wet ground for about three hours) with zirconia beads each having a diameter of 0.5 mm. In this manner, a sol in which powder of Rh-doped CeZrNdY mixed oxide (small particles) having a reduced particle size is dispersed is obtained. This sol is used as an oxygen storage/release material and a binder material for the upper catalyst layer 7 of the upstream catalyst 3.

<Particle Size Distribution of Oxygen Storage/Release Material>

Figure 4:
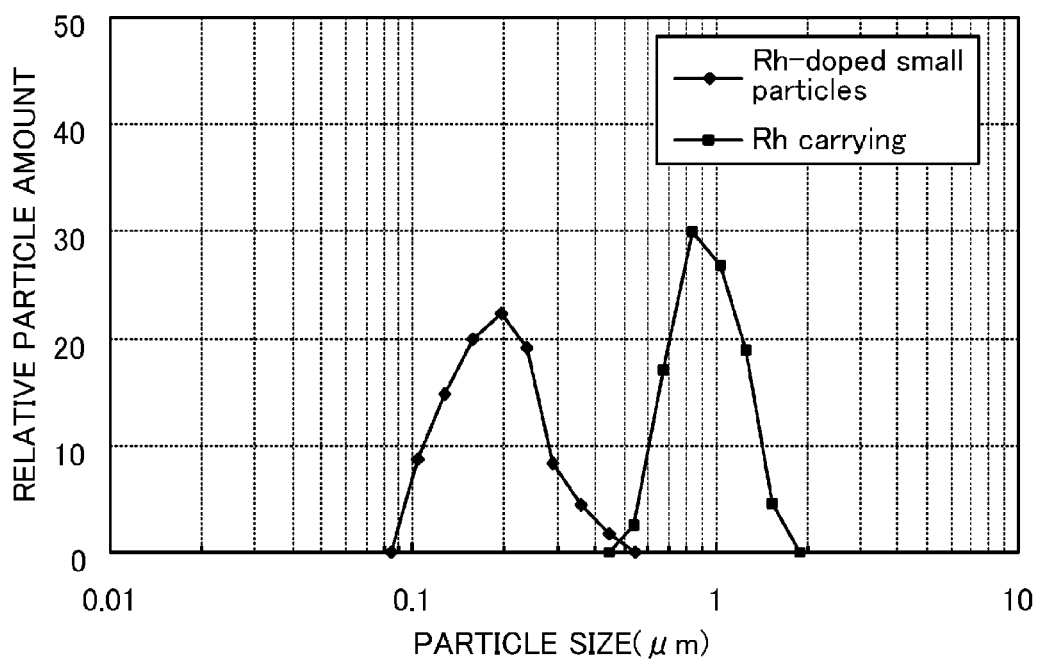
FIG. 4 is a graph showing particle size distributions of two oxygen storage/release materials.

FIG. 4 shows a particle size distribution (a frequency distribution) of the Rh-doped CeZrNdY mixed oxide (small particles) 14 (indicated as "Rh-doped small particles" in FIG. 4) and the Rh-loading CeZrNd mixed oxide 11 (indicated as "Rh-loading" in FIG. 4). To measure the particle size distribution, a laser diffraction particle size distribution analyzer produced by SHIMADZU CORPORATION was used.

The Rh-doped CeZrNdY mixed oxide (small particles) 14 has a peak in the particle size range from 100 nm to 300 nm, both inclusive. The Rh-loading CeZrNd mixed oxide 11 has a peak in the particle size range from 550 nm to 1200 nm, both inclusive. In the Rh-doped CeZrNdY mixed oxide (small particles) 14, the particle size in cumulative distribution for 10 mass % is 109 nm, the particle size in cumulative distribution for 50 mass % is 184 nm, and the particle size in cumulative distribution for 90 mass % is 287 nm That is, the particle size in cumulative distribution for 10 mass % is 100 nm or more, and the particle size in cumulative distribution for 90 mass % is 300 nm or less. In the Rh-loading CeZrNd mixed oxide 11, the particle size in cumulative distribution for 10 mass % is 576 nm, the particle size in cumulative distribution for 50 mass % is 848 nm, and the particle size in cumulative distribution for 90 mass % is 1160 nm. That is, the particle size in cumulative distribution for 10 mass % is 550 nm or more, and the particle size in cumulative distribution for 90 mass % is 1200 nm or less. The Rh-doped CeZrNdY mixed oxide (large particles) before wet grinding has a particle size distribution similar to that of the Rh-loading CeZrNd mixed oxide 11.

<Oxygen Storage Speed>

Rh-doped CeZrNdY mixed oxide (large particles) as an oxygen storage/release material and Rh-doped CeZrNdY mixed oxide (small particles) obtained by wet grinding the Rh-doped CeZrNdY mixed oxide (large particles) were subjected to thermal aging (in an atmospheric environment at 1000° C. for 24 hours). Then, the oxygen storage speeds of these oxides in an oxygen-rich atmosphere were measured. In this measurement, a certain amount of a powder sample (a mixture of an oxygen storage/release material and activated alumina at a mass ratio of 10:90) in a glass tube was kept at 500° C., and 5 ms of an $O_2$ pulse was generated at every 60 seconds with air steadily exhausted. This process was performed in several cycles. Then, 10 ms of a CO pulse was generated with a delay of 30 seconds from the $O_2$ pulse generation. During these pulse generations, a change with time in signal intensity ($O_2$ amount) of mass number 32 in each cycle was measured by a mass analyzer. In this manner, a change with time in signal intensity before the CO pulse and a change with time in signal intensity after the CO pulse were obtained. In this case, a difference between the signal intensity before the CO pulse and the signal intensity after the CO pulse is generated because the sample stores oxygen. Accordingly, the oxygen storage amount is obtained by subtracting the signal intensity after the CO pulse from the signal intensity before the CO pulse. Using this oxygen storage amount, the oxygen storage speed (per a unit time, the storage amount per a unit amount) is obtained. In this sample, oxygen is stored while oxygen previously stored is released in practice. Thus, the oxygen storage speed here is an apparent oxygen storage speed.

Figure 5:
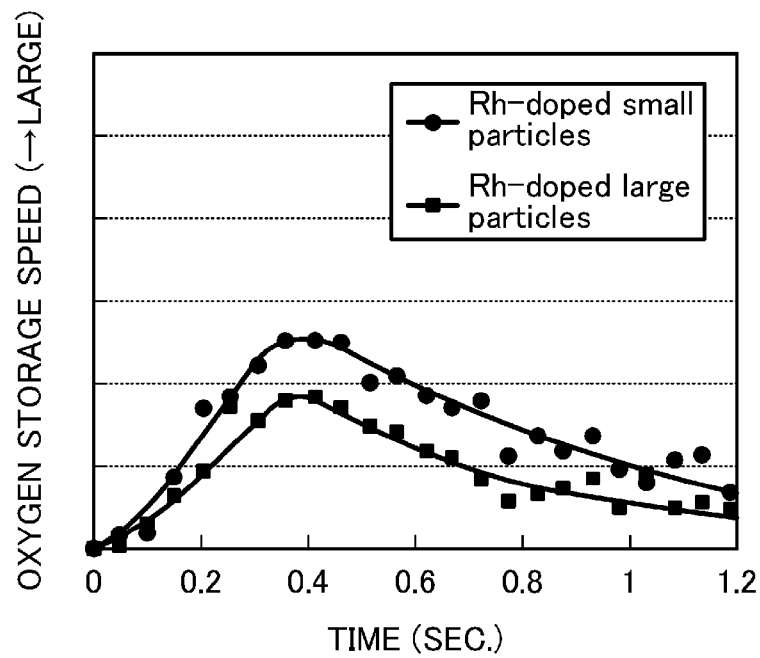
FIG. 5 is a graph showing changes with time in oxygen storage speeds of two oxygen storage/release materials.

FIG. 5 shows changes with time in oxygen storage speeds of Rh-doped CeZrNdY mixed oxide (small particles) (indicated as "Rh-doped small particles" in FIG. 5) and Rh-doped CeZrNdY mixed oxide (large particles) (indicated as "Rh-doped large particles" in FIG. 5). The oxygen storage speed of the small particles is higher than that of the large particles.

Figure 6:
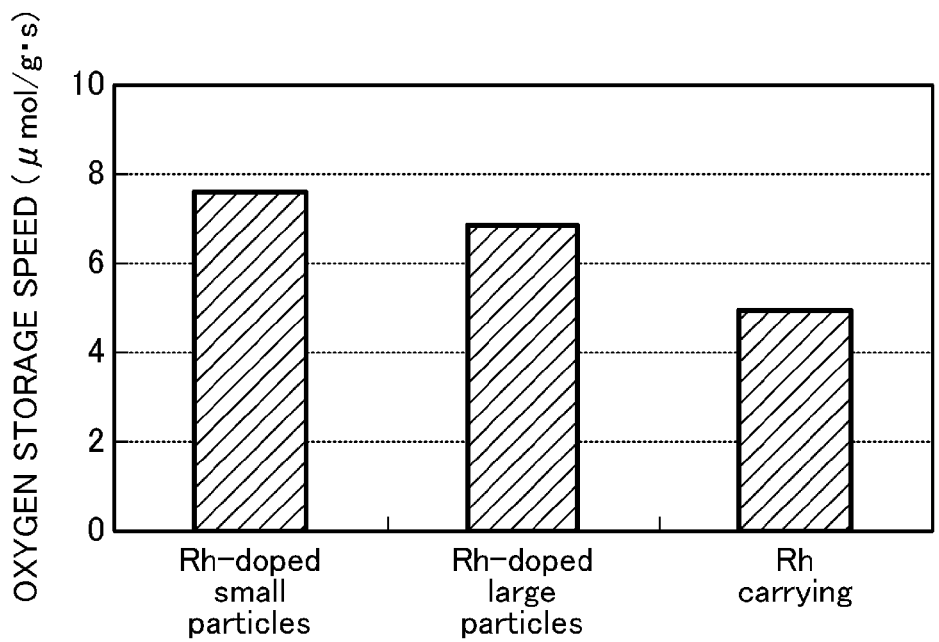
FIG. 6 is a graph showing the oxygen storage speeds of three oxygen storage/release materials.

In the same manner, the oxygen storage speed of Rh-loading CeZrNdY mixed oxide ("Rh-loading") was also measured. FIG. 6 shows the average oxygen storage speeds for 0.5 seconds from the start of measurement of the Rh-doped CeZrNdY mixed oxide ("Rh-doped small particles"), the Rh-doped CeZrNdY mixed oxide ("Rh-doped large particles"), and the Rh-loading CeZrNdY mixed oxide ("Rh-loading"). The oxygen storage speed of the Rh-loading CeZrNdY mixed oxide ("Rh-loading") is lower than that of the Rh-doped CeZrNdY mixed oxide ("Rh-doped large particles").

Example 1

A catalytic system was formed in the following manner using a ceramic honeycomb substrate (with a capacity of about 1 L) having a cell-wall thickness of 3.5 mil ($8.89 \times 10^{-2}$ mm) and including 600 cells per square inch (645.16 $mm^2$) as the upstream catalyst 3, and a ceramic honeycomb substrate (with a capacity of about 1 L) having a cell-wall thickness of 4.5 mil ($11.43 \times 10^{-2}$ mm) and including 400 cells per square inch (645.16 $mm^2$) as the downstream catalyst 5.

—Upper Catalyst Layer 7 of Upstream Catalyst 3—

As the Rh-loading CeZrNd mixed oxide 11, CeZrNd mixed oxide ($CeO_2:ZrO_2:Nd_2O_3$=10:80:10 (mass ratio)) loading Rh by an evaporation to dryness method was employed. The content of the Rh-loading CeZrNd mixed oxide 11 per 1 L of a substrate was 70 g (including 0.304 g of Rh). The particle size distribution thereof is indicated by "Rh-loading" in FIG. 4. This CeZrNd mixed oxide was prepared by coprecipitation.

As the Rh-loading ZrLa-based mixed oxide covered alumina 12, ZrLaSr mixed oxide covered alumina loading Rh by an evaporation to dryness method was employed. In the ZrLaSr mixed oxide covered alumina, ZrLaSr mixed oxide containing Zr, La, and Sr was loaded on the surface of activated alumina, and was prepared in the following manner. Specifically, activated alumina powder was dispersed in a mixed solution of zirconium nitrate, lanthanum nitrate, and strontium nitrate, and aqueous ammonia was added to this mixed solution, thereby producing a precipitation. This precipitation was filtered, washed, dried at 200° C. for two hours, and calcined at 500° C. for two hours, thereby obtaining ZrLaSr mixed oxide covered alumina powder. This ZrLaSr mixed oxide covered alumina powder had a composition of $ZrO_2:La_2O_3:SrO:Al_2O_3=38:2:1.5:58.5$ (mass ratio). The content of the Rh-loading ZrLaSr-based mixed oxide covered alumina per 1 L of a substrate was 30 g (including 0.107 g of Rh).

As the activated alumina 13, activated alumina containing 4 mass % of $La_2O_3$ was employed. The content of this activated alumina 13 per 1 L of a substrate was 10 g.

As the Rh-doped CeZrNdY mixed oxide (small particles) 14, CeZrNdY mixed oxide ($CeO_2:ZrO_2:Nd_2O_3:Y_2O_3=10:80:5:5$ (mass ratio)) doped with Rh was employed, and prepared in the manner described above. The particle size distribution thereof is indicated by "Rh-doped small particles" in FIG. 4. The content thereof per 1 L of a substrate was 12 g (including 0.006 g of Rh). A sol of this Rh-doped CeZrNdY mixed oxide (small particles) was used as a binder in the upper catalyst layer 7.

—Lower Catalyst Layer 8 of Upstream Catalyst 3—

As the CeZrNd mixed oxide 15, CeZrNd mixed oxide prepared by coprecipitation and having a composition of $CeO_2:ZrO_2:Nd_2O_3=23:67:10$ (mass ratio) was employed. The content of this CeZrNd mixed oxide per 1 L of a substrate was 20 g. As the Pd-loading CeZrNd mixed oxide 16, CeZrNd mixed oxide ($CeO_2:ZrO_2:Nd_2O_3=23:67:10$ (mass ratio)) prepared by coprecipitation and loading Pd by an evaporation to dryness method was employed. The content of this CeZrNd mixed oxide per 1 L of a substrate was 35 g (including 0.194 g of Pd). As the Pd-loading activated alumina 17, activated alumina containing 4 mass % of $La_2O_3$ and loading Pd by an evaporation to dryness method was employed. The content of this activated alumina per 1 L of a substrate was 45 g (including 1.889 g of Pd). The content of the zirconia binder 18 per 1 L of a substrate was 10 g.

—Catalyst Layer 19 of Downstream Catalyst 5—

As the Rh-loading Rh-doped CeZrNd mixed oxide 20, Rh-doped CeZrNd mixed oxide (large particles) loading Rh by an evaporation to dryness method was employed. In the Rh-doped CeZrNd mixed oxide (large particles), CeZrNd mixed oxide ($CeO_2:ZrO_2:Nd_2O_3=23:67:10$ (mass ratio)) was doped with Rh, and was prepared by coprecipitation. No wet grinding was performed. Accordingly, the Rh-loading Rh-doped CeZrNd mixed oxide 20 shows a particle size distribution similar to that indicated by "Rh-loading" in FIG. 4. The content thereof per 1 L of a substrate was 112 g (including 0.006 g of Rh for doping, and 0.035 g of Rh carried thereon).

As the Pt-loading alumina (Pt/A) 21, activated alumina containing 4 mass % of $La_2O_3$ and loading Pt by an evaporation to dryness method was employed. The content thereof per 1 L of a substrate was 50 g (including 0.050 g of Pt). The content of zirconia binder 18 per 1 L of a substrate was 18 g.

The contents of components of the upstream catalyst 3 and the downstream catalyst 5 of Example per 1 L of a substrate are shown in Table 1. The total content of the oxygen storage/release materials (Rh-loading CeZrNd mixed oxide and Rh-doped CeZrNdY mixed oxide (small particles)) for the upper catalyst layer of the upstream catalyst per 1 L of a substrate was 82 g, and is larger than the total content, i.e., 112 g, of the oxygen storage/release material (Rh-loading Rh-doped CeZrNd mixed oxide) for the catalyst layer of the downstream catalyst per 1 L of a substrate.

TABLE 1

| | | | Example 1 |
|---|---|---|---|
| | | | Content |
| upstream catalyst | upper catalyst layer | Rh-loading CeZrNd mixed oxide | 70.000 g/L (Rh = 0.304 g/L) |
| | | Rh-loading ZrLaSr mixed oxide covered alumina | 30.000 g/L (Rh = 0.107 g/L) |
| | | activated alumina | 10.000 g/L |
| | | Rh-doped CeZrNdY mixed oxide (small particles) | 12.000 g/L (Rh = 0.006 g/L) |
| | lower catalyst layer | CeZeNd mixed oxide | 20.000 g/L |
| | | Pd-loading CeZrNd mixed oxide | 35.000 g/L (Pd = 0.194 g/L) |
| | | Pd-loading activated alumina | 45.000 g/L (Pd = 1.889 g/L) |
| | | zirconia binder | 10.000 g/L |
| downstream catalyst | catalyst layer (single layer) | Rh-loading Rh-doped CeZrNd mixed oxide | 112.000 g/L (Rh for doping = 0.065 g/L, carried Rh = 0.035 g/L) |
| | | Pt-loading alumina | 50.000 g/L (Pd = 0.050 g/L) |
| | | zirconia binder | 18.000 g/L |

Comparative Example

A catalytic system was formed in the same manner as in Example except that an alumina binder (whose content per 1 L of a substrate was 10 g) was employed instead of the Rh-doped CeZrNdY mixed oxide (small particles) 14 for the upper catalyst layer 7 of the upstream catalyst 3, the content of the Rh-loading CeZrNd mixed oxide 11 per 1 L of a substrate was changed to 82 g (including 0.310 g of Rh), and the content of the activated alumina 13 was zero. The contents of components of the upstream catalyst 3 and the downstream catalyst 5 of Comparative Example are shown in Table 2.

TABLE 2

| | | | Content |
|---|---|---|---|
| upstream catalyst | upper catalyst layer | Rh-loading CeZrNd mixed oxide | 82.000 g/L (Rh = 0.310 g/L) |
| | | Rh-loading ZrLaSr mixed oxide covered alumina | 30.000 g/L (Rh = 0.107 g/L) |
| | | activated alumina | 0.000 g/L |
| | | alumina binder | 10.000 g/L |
| | lower catalyst layer | The same as in Example (Table 1) | |
| downstream catalyst | catalyst layer (single layer) | The same as in Example (Table 1) | |

<Oxygen Storage/Release Amount>

Figure 7:
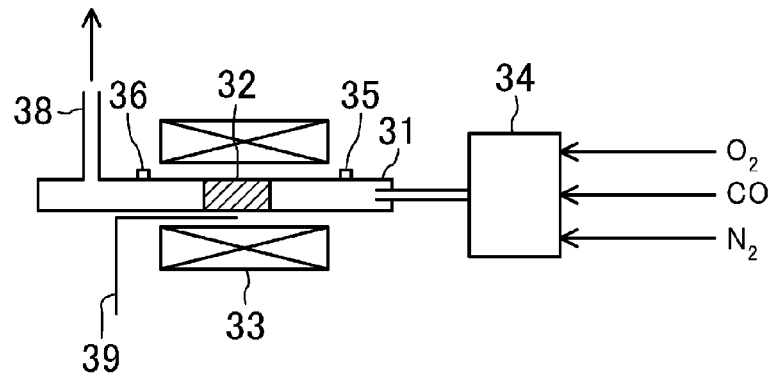
FIG. 7 is a view illustrating a configuration of a device for measuring the oxygen storage/release amount.

Sample materials (each including a single catalyst layer) in each of which only the upper catalyst layer of the upstream catalyst of Example, only the catalyst layer of the downstream catalyst of Example, and only the upper catalyst layer of the upstream catalyst of Comparative Example were formed on substrates, were prepared. From each of these sample materials, a core sample having a substrate capacity of about 25 mL was cut out, and attached to a model gas flow reactor. Then, the oxygen storage/release amount was measured. FIG. 7 illustrates a configuration of a test device for measuring the oxygen storage/release amount. In FIG. 7, reference character 31 denotes a glass tube holding a sample 32, which is heated at a predetermined temperature by a heater 33. A pulse gas generator 34 capable of supplying pulses of an $O_2$ gas and a CO gas while supplying a base gas $N_2$ is connected to the glass tube 31 upstream of the sample 32. An exhaust part 38 is provided in the glass tube 31 downstream of the sample 32. In addition, A/F sensors (oxygen sensors) 35 and 36 are provided in the glass tube 31 upstream and downstream, respectively, of the sample 32. A thermocouple 39 for temperature control is attached to a sample-holding portion of the glass tube 31.

Figure 8:
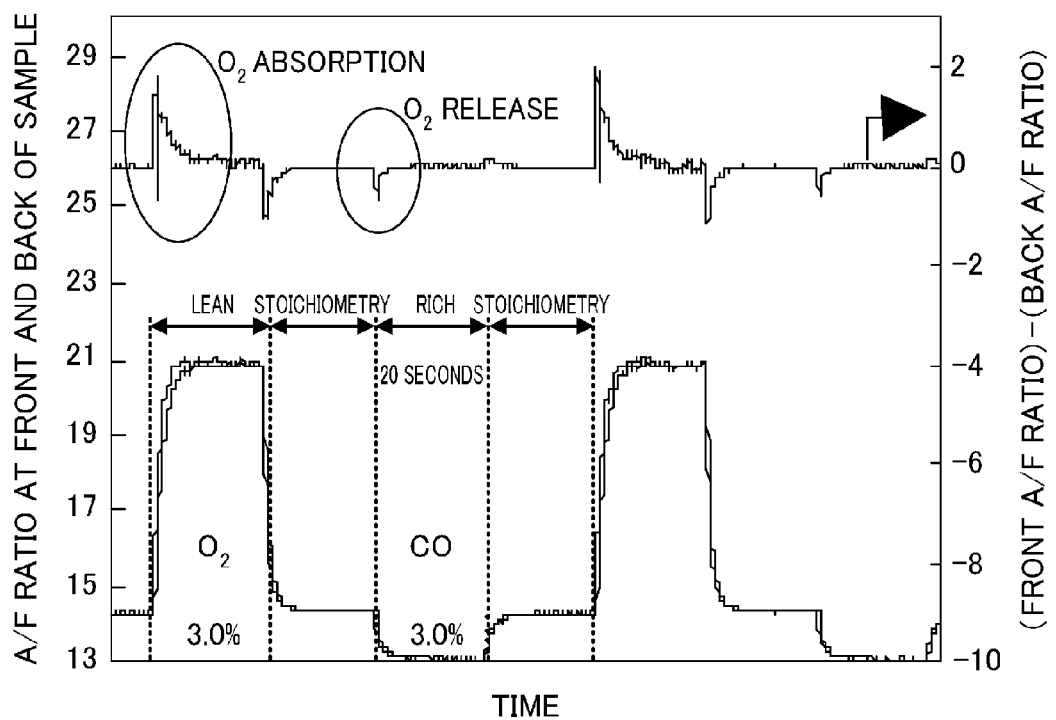
FIG. 8 is a graph showing changes with time in A/F values at the front and back of a sample and in A/F difference between the front and back of the sample in measurement of the oxygen storage/release amount.
Figure 9:
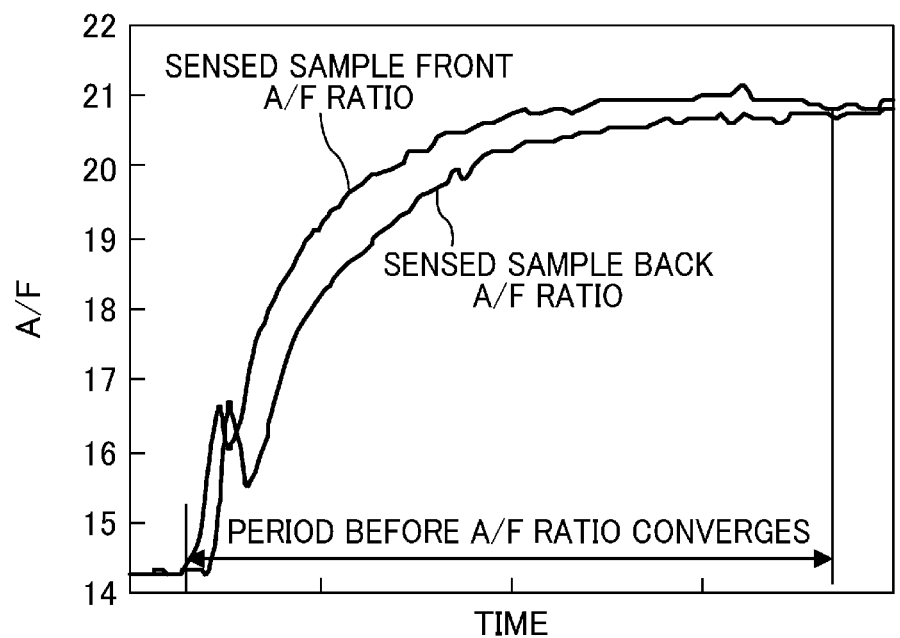
FIG. 9 is a graph showing changes with time in A/F difference between the front and back of a catalyst in measurement of the oxygen storage/release amount.

In measurement, as shown in FIG. 8, $O_2$ pulses (20 seconds) and CO pulses (20 seconds) were alternately generated at intervals (20 seconds) while the sample temperature in the glass tube 31 was kept at a predetermined level and a base gas $N_2$ was supplied to exhaust air through the exhaust part 38, thereby repeating cycles of lean→stoichiometry→rich→stoichiometry. As shown in FIG. 9, an output difference in A/F ratio (front A/F ratio−back A/F ratio) obtained by the A/F sensors 35 and 36 respectively at the front and back of the sample in a period immediately after switching from stoichiometry to rich before this output difference disappears was converted into an $O_2$ amount, and this $O_2$ amount was used as an $O_2$ release amount (an oxygen storage/release amount) of the sample. This $O_2$ release amount was measured at every 50° C. from 350° C. to 500° C.

Figure 10:
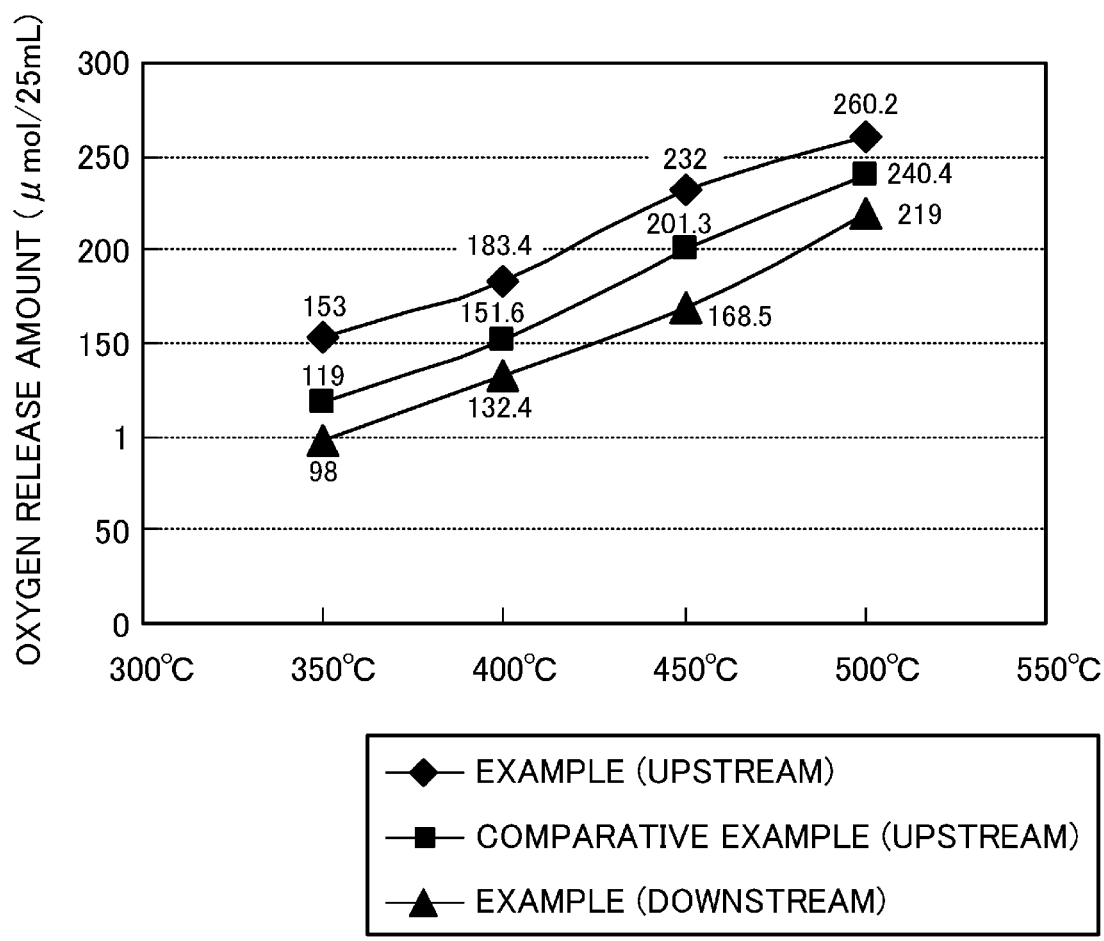
FIG. 10 is a graph showing temperature characteristics of the oxygen release amounts of three upper catalyst layers.

FIG. 10 shows the results of the above measurement. As shown in FIG. 10, the oxygen storage/release amount of Example is larger than that of Comparative Example in the temperature range from 350° C. to 500° C. (especially at 350° C.), and storage and release of oxygen easily occur in Example at low temperatures than that in Comparative Example. Specifically, in Example, although the amount of the oxygen storage/release material (82 g/L as the total amount of Rh-loading CeZrNd mixed oxide and Rh-doped CeZrNdY mixed oxide (small particles)) for the upper catalyst layer of the upstream catalyst was smaller than that (112 g/L as the amount of Rh-loading Rh-doped CeZrNd mixed oxide) of the catalyst layer of the downstream catalyst, the oxygen storage/release amount of the oxygen storage/release material for the upper catalyst layer of the upstream catalyst is larger than that of the catalyst layer of the downstream catalyst. This is largely because of the difference in total surface area due to the difference in particle size among oxygen storage/release materials, which will be described below, in addition to the structure in which the amount of Rh loaded on the oxygen storage/release material included in the upper catalyst layer of the upstream catalyst is larger than Rh loaded on the oxygen storage/release material included in the downstream catalyst in Example.

<Specific Surface Area of Oxygen Storage/Release Material>

Rh-doped CeZrNdY mixed oxide (small particles) used as the oxygen storage/release material for the upper catalyst layer of the upstream catalyst has a particle size (a particle size distribution) different from that of Rh-loading CeZrNd mixed oxide or Rh-loading Rh-doped CeZrNd mixed oxide used as the oxygen storage/release material for the catalyst layer of the downstream catalyst in Example. It was examined how the difference in particle size affects the contact between the oxygen storage/release material and an exhaust gas.

The frequency of contact between the oxygen storage/release material and an exhaust gas is generally evaluated by measuring the specific surface area by a BET method. However, the specific surface area obtained by this method is greatly affected by adsorption in pores in the case of a porous material, and thus, is not suitable for evaluation of the contact frequency due to the difference in particle size.

In view of this, heat treatment was performed in such a manner that each of Rh-doped CeZrNdY mixed oxide (small particles), Rh-loading CeZrNd mixed oxide, and Rh-loading Rh-doped CeZrNdY mixed oxide was held at 1300° C. for four hours in an atmospheric environment, and a BET specific surface area was measured with the influence of each pore reduced (with pores considerably crushed). In addition, the specific surface area (a theoretical value without consideration of pores) of each of the above oxides was calculated based on the particle size distribution thereof on the assumption that these materials are spherical particles.

Figure 11:
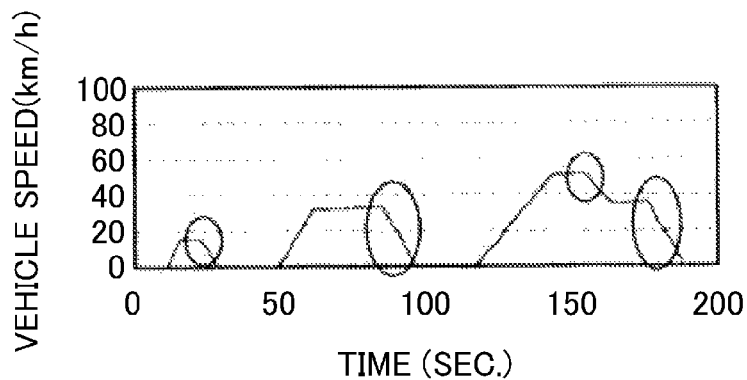
FIG. 11 is a graph showing part of an EU mode (a driving mode of an automobile in an exhaust gas test).

Table 3 shows the specific surface area and the total surface area of each of the oxygen storage/release materials (70 g/L of Rh-loading CeZrNd mixed oxide and 12 g/L of Rh-doped CeZrNdY mixed oxide (small particles)) for the upper catalyst layer of the upstream catalyst of Example, the oxygen storage/release material (82 g/L of Rh-loading CeZrNd mixed oxide) for the upper catalyst layer of the upstream catalyst of Comparative Example, and the oxygen storage/release materials (112 g/L of Rh-loading Rh-doped CeZrNdY mixed oxide) for the catalyst layers of the downstream catalysts of Example and Comparative Example, obtained by the above two methods. Table 3 also shows the content of the oxygen storage/release material per a unit area on the surface of the honeycomb substrate on which the catalyst layer is carried.

were measured for Example and Comparative Example. FIG. 11 shows part of the EU mode. In this case, deceleration periods are a period "from 23 seconds to 28 seconds," a period "from 85 seconds to 96 seconds," a period "from 155 seconds to 163 seconds," and a period "from 177 seconds to 188 seconds" enclosed by circles in FIG. 11.

TABLE 3

| | oxygen storage/release material | | | BET method after heat treatment | | theoretical value in particle size distribution | |
|---|---|---|---|---|---|---|---|
| | type | content/ unit volume | content/ unit area | specific surface area | total surface area | specific surface area | total surface area |
| upper catalyst layer of upstream catalyst of Example | Rh-loading CeZrNd mixed oxide | 70.000 g/L | 19.81 g/m² | 3.4 m²/g | 238 m² | 0.86 m²/g | 60.06 m² |
| | Rh-doped CeZrNdY mixed oxide (small particles) | 12.000 g/L | 3.40 g/m² | 11.5 m²/g | 138 m² | 3.95 m²/g | 47.45 m² |
| | total | 82.000 g/L | 23.21 g/m² | — | 376 m² | — | 107.51 m² |
| upper catalyst layer of upstream catalyst of Comparative Example | Rh-loading CeZrNd mixed oxide | 82.000 g/L | 23.21 g/m² | 3.4 m²/g | 279 m² | 0.86 m²/g | 70.52 m² |
| catalyst layer of downstream catalyst of Example and Comparative Example | Rh-loading Rh-doped CeZrNd mixed oxide | 112.000 g/L | 39.00 g/m² | 3.2 m²/g | 358 m² | 0.86 m²/g | 96.32 m² |

As shown in Table 3, in Example, the upper catalyst layer of the upstream catalyst has a total amount (82 g/L) of the oxygen storage/release material smaller than the oxygen storage/release material amount (112 g/L) of the catalyst layer of the downstream catalyst, but has a total surface area larger than that of the catalyst layer of the downstream catalyst. This is because Rh-doped CeZrNdY mixed oxide (small particles) having a large specific surface area is used as a part of the oxygen storage/release material for the upstream catalyst. Accordingly, the oxygen storage/release material for the upper catalyst layer of the upstream catalyst is more often in contact with an exhaust gas than the oxygen storage/release material for the catalyst layer of the downstream catalyst, as a whole.

In addition, as shown in Table 3, a comparison between Example and Comparative Example shows the following phenomenon. In Example, although the total amount (82 g/L) of the oxygen storage/release material for the upper catalyst layer of the upstream catalyst is smaller than the amount (112 g/L) of the oxygen storage/release material for the catalyst layer of the downstream catalyst as described above, the total surface area of the oxygen storage/release material for the upper catalyst layer of the upstream catalyst is larger than that of the oxygen storage/release material for the catalyst layer of the downstream catalyst. On the other hand, in Comparative Example, the total amount (82 g/L) of the oxygen storage/release material for the upper catalyst layer of the upstream catalyst is smaller than the amount (112 g/L) of the oxygen storage/release material for the catalyst layer of the downstream catalyst, and the total surface area of the oxygen storage/release material for the upper catalyst layer of the upstream catalyst is smaller than that of the oxygen storage/release material for the catalyst layer of the downstream catalyst. This supports the results shown in FIG. 10 that Example having a larger specific surface area of the oxygen storage/release material can exhibit oxygen storage/release capacity at low temperatures.

<NOx Purification Efficiency at Deceleration in EU Mode>

NOx purification efficiencies at deceleration in an EU mode (a European automobile driving mode for exhaust gas)

Table 4 shows the results of the above measurement. A comparison between Example and Comparative Example shows that NOx purification efficiency at deceleration is high in Example. In particular, a large difference in NOx purification efficiency is observed after a short lapse of time from a start-up of an engine, i.e., when the exhaust gas temperature is low.

TABLE 4

| | NOx purification efficiency (%) at deceleration | | | |
|---|---|---|---|---|
| | 23-28 sec. | 85-96 sec. | 155-163 sec. | 177-188 sec. |
| Example | 43.6 | 94.5 | 99.4 | 99.9 |
| Comparative Example | 39.6 | 88.6 | 98.5 | 99.8 |

As shown in Table 4, Example shows a high NOx purification efficiency. This is supposed to be because of the following reasons. In Example, Rh-doped CeZrNdY mixed oxide (small particles) was used as an oxygen storage/release material for the upper catalyst layer of the upstream catalyst. This structure causes the oxygen release amount in the upstream catalyst to be larger than that in the downstream catalyst, and allows the oxygen storage/release material in the upstream catalyst to be often in contact with an exhaust gas.

<Emission Amount in EU Mode>

Figure 12:
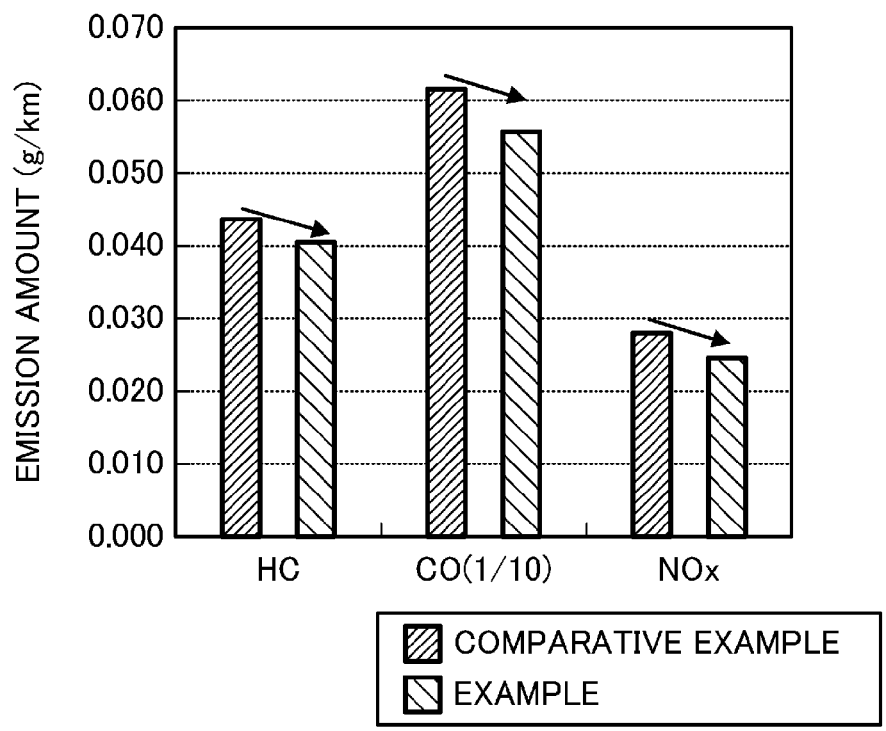
FIG. 12 is a graph showing emission amounts of Example and Comparative Example.

FIG. 12 shows results of measurement of the amounts of emission (HC, CO, and NOx) in an EU mode in Example and Comparative Example. FIG. 12 shows that the catalyst of Example exhibits high performance not only for NOx purification but also purification of HC and CO.

What is claimed is:

1. An exhaust-gas purification catalytic system, comprising an upstream catalyst and a downstream catalyst provided upstream and downstream, respectively, in a flow of exhaust gas in an exhaust passage of an engine, wherein each of the upstream catalyst and the downstream catalyst includes an Rh-including catalyst layer including Rh and provided on a substrate, the Rh-including catalyst layer of the upstream catalyst includes, as oxygen storage/release materials, Rh-doped CeZr-based mixed oxide containing Ce and Zr and also containing Rh dissolved therein, and Rh-loading CeZr-based mixed oxide containing Ce and Zr and loading Rh on a surface thereof, the Rh-including catalyst layer of the downstream catalyst includes, as an oxygen storage/release material, only Rh-doped CeZr-based mixed oxide containing Ce and Zr and also containing Rh dissolved therein, a content of the oxygen storage/release material included per 1 L of the substrate in the Rh-including catalyst layer of the upstream catalyst is smaller than that of the downstream catalyst, and the Rh-doped CeZr-based mixed oxide included as the oxygen storage/release material in the Rh-including catalyst layer of the upstream catalyst shows a particle size distribution having a peak particle size smaller than that of the Rh-doped CeZr-based mixed oxide included as the oxygen storage/release material in the Rh-including catalyst layer of the downstream catalyst.

2. The exhaust-gas purification catalytic system of claim 1, wherein the downstream catalyst includes only the Rh-including catalyst layer on the substrate, and the Rh-including catalyst layer further includes Pt-loading alumina in which Pt is loaded on a surface of activated alumina, in addition to the Rh-doped CeZr-based mixed oxide as the oxygen storage/release material.

3. The exhaust-gas purification catalytic system of claim 2, wherein the Rh-including catalyst layer of the upstream catalyst further includes a catalytic component in which ZrLa-based mixed oxide containing Zr, La, and an alkali earth metal is loaded on activated alumina and in which Rh is loaded on the ZrLa-based mixed oxide, in addition to the Rh-doped CeZr-based mixed oxide and the Rh-loading CeZr-based mixed oxide as the oxygen storage/release materials.

4. The exhaust-gas purification catalytic system of claim 2, wherein the Rh-doped CeZr-based mixed oxide included in the Rh-including catalyst layer of the upstream catalyst contains Rh, Ce, Zr, Nd, and Y as metal components, and the Rh-doped CeZr-based mixed oxide included in the Rh-including catalyst layer of the downstream catalyst contains Rh, Ce, Zr, and Nd as metal components, and does not contain Y.

5. The exhaust-gas purification catalytic system of claim 1, wherein the Rh-including catalyst layer of the upstream catalyst further includes a catalytic component in which ZrLa-based mixed oxide containing Zr, La, and an alkali earth metal is loaded on activated alumina and in which Rh is loaded on the ZrLa-based mixed oxide, in addition to the Rh-doped CeZr-based mixed oxide and the Rh-loading CeZr-based mixed oxide as the oxygen storage/release materials.

6. The exhaust-gas purification catalytic system of claim 5, wherein the Rh-doped CeZr-based mixed oxide included in the Rh-including catalyst layer of the upstream catalyst contains Rh, Ce, Zr, Nd, and Y as metal components, and the Rh-doped CeZr-based mixed oxide included in the Rh-including catalyst layer of the downstream catalyst contains Rh, Ce, Zr, and Nd as metal components, and does not contain Y.

7. The exhaust-gas purification catalytic system of claim 1, wherein the Rh-doped CeZr-based mixed oxide included in the Rh-including catalyst layer of the upstream catalyst contains Rh, Ce, Zr, Nd, and Y as metal components, and the Rh-doped CeZr-based mixed oxide included in the Rh-including catalyst layer of the downstream catalyst contains Rh, Ce, Zr, and Nd as metal components, and does not contain Y.

* * * * *